United States Patent
Winzer

[11] 3,828,187
[45] Aug. 6, 1974

[54] COHERENT-OPTICAL IMAGE CONVERTER

[75] Inventor: Gerhard Winzer, Munich, Germany

[73] Assignee: Siemens Aktiengesellschaft, Berlin & Munich, Germany

[22] Filed: June 12, 1973

[21] Appl. No.: 369,157

[30] Foreign Application Priority Data
June 30, 1972  Germany............................ 2232247

[52] U.S. Cl. ........... 250/213 VT, 350/150, 250/225
[51] Int. Cl. ............................................. H01j 31/50
[58] Field of Search ............. 250/213 VT, 225, 227; 350/150; 356/118; 313/65 LF, 65 R

[56] References Cited
UNITED STATES PATENTS
3,499,157  3/1970  Satake et al. ................... 250/225 X
3,683,185  8/1972  Muehllehner ............ 250/213 VT X
3,714,439  1/1973  Williams et al........... 250/213 VT X

*Primary Examiner*—Walter Stolwein
*Attorney, Agent, or Firm*—Hill, Gross, Simpson, Van Santen, Steadman, Chiara & Simpson

[57] ABSTRACT

An image converter tube for direct time conversion of an incoherent image into a coherent image with a photo cathode, an electron optic and a transparent planar anode which is arranged on a viewing screen. An electro-optical crystalline coating is arranged on the anode and is provided with a dielectric mirror coating and with a device for the external illumination of the electro-optical crystalline coating with a plane-polarized laser light beam. The light beam, after passing through the crystalline layer is rotated in its direction of polarization and after passing through a subsequent analyzer is intensity modulated. The cathode is a planar photo cathode on which the incoherent image may be formed, which for all image points is directly and in parallel transferable onto the electro-optical crystalline coating.

4 Claims, 2 Drawing Figures

COHERENT-OPTICAL IMAGE CONVERTER

BACKGROUND OF THE INVENTION

1. Field of the Invention

This invention relates to an image converter tube for direct time conversion of an incoherent image into a coherent image, and more particularly to such an image converter tube having a photo cathode, an electron optic, and a transparent planar anode which is carried on the viewing screen. The anode has arranged thereon an electro-optical crystalline coating which is provided with a dielectric mirror coating, and wherein a device is provided for the external illumination of the electro-optical crystalline coating with a plane-polarized laser light beam which, after passing through the crystalline layer, is rotated in its direction of polarization by stimulated birefringence and which, after passing through a subsequent analyzer, is intensity modulated.

2. Description of the Prior Art

Coherent optical image converters are necessary for many technical applications of holography, in particular in connection with data storage, acoustic holography, and in connection with sign recognition by means of matched filtering. The sign recognition process is frequently rendered more difficult, due to heterodyning of interference signals. Concerning radar engineering, for example, the information content of blips must, as compared with strong interference signals, be emphasized or underscored by means of a properly phased addition of several blips. For multiple heterodyning of blips, signal memories having a high storage capacity and a high recording and erasing speed are necessary. The stored information is, for example, fed to a coherent optical analog computer for evaluation.

A known simple image converter is a diapositive or a photo chromatic film which is, first of all, illuminated with the light of the incoherent image, and is then brought into a coherent beam path. With photographic films, of course, an additional development process is necessary.

In the article "A Reflex Electro-Optic Light Valve Television Display" by D. H. Pritchard (RCA Review, December 1969, Pages 567 to 592) a device is described which can likewise be employed for simple measurements. This device comprises a picture tube, at whose screen area inside the tube a thin potassium dihydrogen phosphate crystal is arranged, and the screen area is provided with a transparent positive electrode. In the event that an electric field borders on this crystal, it turns the direction of polarization of a plane-polarized light beam by stimulated birefringence. The crystal is scanned by an electron beam on the surface facing the inside of the tube, whereby a charge profile is created, which profile is proportional to the current density of the electron beam. A field distribution which depends on the charge profile is then present in the crystal. A plane-polarized light beam, which passes through the crystal, is turned in its direction of polarization as a function of the field distribution, and is intensity modulated after passing through an analyzer which withstands the transmission intensity as a function of the angle of rotation of the direction of polarization.

The sequential building up of the field distribution in the crystal, however, takes too long for many applications.

SUMMARY OF THE INVENTION

It is the object of the present invention to provide an image converter tube for direct time conversion of images, which are not created with coherent light, into coherent images.

The above object is realized in accordance with invention through the provision of a planar photo cathode for the image converter tube, on which cathode the incoherent image is formed, which for all images points is directly and in parallel transferrable onto an electro-optical crystalline coating.

With such a device constructed as outlined above, it is no longer necessary to scan a received incoherent image in chronological sequence and to convert the same by way of a storage effect into a coherent image, but the image conversion takes place in a direct time process. After a momentary erasure of the charge profile, indicated on the crystalline coating, the device is immediately ready for the next image conversion process.

In front of the photo cathode a light conductor optic is advantageously arranged. The light conductor optic images on the photo cathode all partial ranges of the information carrying bundle of light beams. By means of this light conductor optic, the image converter can, for the arriving image, be connected with a receiving optic.

The electron optic is, in particular, developed in such a way that the electron emission from the photo cathode directly generates on the electro optical crystalline coating a charge profile which is dependent on the distribution of intensity of the image beam.

If the arriving incoherent images intended for the coherent optical image conversion are of weak intensity, then, in particular, the image impinging upon the photo cathode, can be amplified for increased intensity by means of an additional image amplifier.

BRIEF DESCRIPTION OF THE DRAWINGS

Other objects, features and advantages of the invention, its organization, construction and operation will be best understood from the following detailed description taken in conjunction with the accompanying drawing, on which:

Referring to FIG. 1, an incoherent bundle of light beams 1, which is intensity modulated over its cross section, impinges upon a receiving optic 2 which is rotated in the direction of the arriving bundle of beams 1. The image in the receiving optic 2 is imaged by way of a fibre bundle light guide 3 onto a photo cathode 4, which forms part of an image tube 5.

Figure 1:
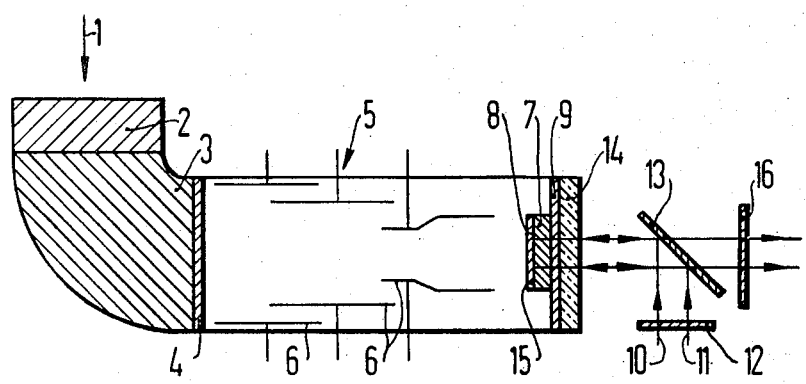
FIG. 1 is a schematic representation of a fundamental arrangement of a coherent optical image converter constructed in accordance with the principles of the present invention.

The image tube 5 contains, next to the photo cathode 4, an electron optic 6, which images the current density modulated electron beams, which are emitted from the photo cathode 4, onto a potassium dihydrogen phosphate crystal 7. An image dependent negative charge distribution is then created on the surface 8 of the KDP crystal. Due to the high potential of the anode 9, which is arranged on the opposite surface of the crystal 7, an image dependent field distribution arises in the crystal 7.

From the exterior of the image tube 5, a coherent bundle of light beams, here two partial beams 10 and 11 being illustrated, is plane polarized in a polarizer 12, and is directed by means of a semipermeable mirror 13 toward the image tube 5. The coherent group of light beams (10, 11) penetrates through a window 14, the transparent anode 9, and by means of reflection on a dielectric mirror coating 15, the electro optical crystal 7 twice before it impinges, after having passed through the semipermeable mirror 13, upon an analyzer 16 which transmits light only, the polarization direction of which is perpendicular to the direction of the light beam generated by the polarizer 12. Since, in the case of the traversal of the coherent bundle of light beams through the crystal 7 the polarization is elliptically as a consequence of stimulated birefringence depending on the field distribution, the cross section of the bundle of light beams which leaves the analyzer 16 exhibits an image dependent intensity profile. This coherent bundle of image beams is then further processed in order to match the particular applications.

Figure 2:
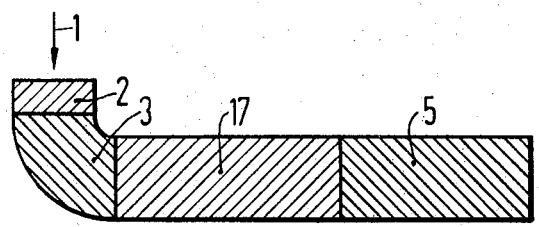
FIG. 2 illustrates an image converter having an image amplifier.

FIG. 2 illustrates the image tube 5, illustrated in FIG. 1, at which an image converter 17 is directly connected between the fibre optic 3 and the tube 5. The image amplifier 17 is connected with the receiver optic 2 by way of the fibre optic 3. A bundle of light beams 1 having a weak intensity may therefore be amplified prior to the coherent optical conversion set forth with respect to the apparatus illustrated in FIG. 1.

Although I have described my invention by reference to certain specific illustrative embodiments, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. An image converter tube for registering rapidly changing processes in a coherent optical analog computer for direct time conversion of an incoherent image into a coherent image comprising a photo cathode for receiving an incoherent light beam and generating electron emission corresponding to an incoherent image, a viewing screen, a transparent planar anode mounted on said viewing screen, an electron optic for imaging the emission of said photo cathode, an electrical optical crystal layer mounted on said anode, a dielectric mirror coating on said crystal layer, said crystal layer receiving the emission from said cathode and providing in response thereto together with a high potential on said anode an image dependent field distribution which causes an image dependent charge distribution on the surface of said crystal facing said cathode, and means for externally illuminating the electrical optical crystal with a linear polarized laser light beam which, after passing through said electrical optical crystal layer, is rotated in its direction of polarization, and analyzer means for intensity modulating the rotated beam, said cathode being a planar photo cathode on which an incoherent image is reproducible for which all image points are directly and simultaneously transferable through emission to said electrical optical crystal layer.

2. The image converter tube as claimed in claim 1, comprising a light conductor optic arranged in front of said photo cathode for imaging the incoherent image on said photo cathode.

3. An image converter tube as claimed in claim 1 wherein said electron optic includes means for effecting electron emission from said photo cathode for generating on said electrical optical crystal layer a charge profile which is dependent on the light intensity distribution.

4. An image converter as claimed in claim 1, comprising an additional image amplifier arranged in the beam path ahead of said light conductor optic.

* * * * *